United States Patent
Lee

(10) Patent No.: US 10,879,550 B2
(45) Date of Patent: Dec. 29, 2020

(54) CATHODE FOR FUEL CELLS AND METHOD OF MANUFACTURING MEMBRANE ELECTRODE ASSEMBLY HAVING THE SAME

(71) Applicants: HYUNDAI MOTOR COMPANY, Seoul (KR); KIA MOTORS CORPORATION, Seoul (KR)

(72) Inventor: Hoon Hui Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 351 days.

(21) Appl. No.: 15/848,880

(22) Filed: Dec. 20, 2017

(65) Prior Publication Data

US 2018/0183083 A1 Jun. 28, 2018

(30) Foreign Application Priority Data

Dec. 28, 2016 (KR) .................. 10-2016-0181660

(51) Int. Cl.
*H01M 8/1004* (2016.01)
*H01M 4/88* (2006.01)
(Continued)

(52) U.S. Cl.
CPC ....... *H01M 8/1004* (2013.01); *H01M 4/8605* (2013.01); *H01M 4/8668* (2013.01);
(Continued)

(58) Field of Classification Search
CPC . H01M 2004/8689; H01M 2008/1095; H01M 4/8605; H01M 4/8668;
(Continued)

(56) References Cited

U.S. PATENT DOCUMENTS

| 2001/0009733 A1* | 7/2001 | Campbell | ........... H01M 8/1004 |
| | | | 429/532 |
| 2010/0062929 A1* | 3/2010 | Virkar | ........... B01J 23/42 |
| | | | 502/304 |
| 2013/0344413 A1* | 12/2013 | Kim | ........... H01M 4/926 |
| | | | 429/480 |

FOREIGN PATENT DOCUMENTS

| JP | 2012-084416 A | 4/2012 |
| JP | 2013-127865 A | 6/2013 |

(Continued)

OTHER PUBLICATIONS

M. Lee, et al., "New evaluation method for the effectiveness of platinum/carbon electrocatalysts under operating conditions," Electrochimica Acta No. 55, 2010, pp. 8504-8512.

*Primary Examiner* — Adam A Arciero
(74) *Attorney, Agent, or Firm* — Morgan, Lewis & Bockius LLP

(57) ABSTRACT

A cathode for fuel cells includes a carbon support, a platinum catalyst supported on the carbon support and an ionomer surrounding the carbon support and the platinum catalyst, wherein the ionomer is removed from the surface of the platinum catalyst. The cathode for fuel cells has a structure in which an ionomer film coating the surface of the platinum catalyst and thus acting as oxygen transfer resistance is removed from the surface of the platinum catalyst and, thus, mass transfer resistance (oxygen diffusion resistance) may be reduced and performance of a fuel cell may be improved. Further, the cathode having a low amount of platinum used due to improvement in platinum utilization may effectively execute oxygen transfer and thus increase the amount of platinum participating in catalysis, as compared to conventional cathodes.

7 Claims, 2 Drawing Sheets

(51) Int. Cl.
*H01M 4/90* (2006.01)
*H01M 8/1018* (2016.01)
*H01M 4/92* (2006.01)
*H01M 4/86* (2006.01)

(52) U.S. Cl.
CPC ....... *H01M 4/8825* (2013.01); *H01M 4/8828* (2013.01); *H01M 4/8878* (2013.01); *H01M 4/8882* (2013.01); *H01M 4/9083* (2013.01); *H01M 4/926* (2013.01); *H01M 8/1018* (2013.01); *H01M 2004/8689* (2013.01); *H01M 2008/1095* (2013.01); *Y02P 70/50* (2015.11)

(58) Field of Classification Search
CPC ............. H01M 4/8825; H01M 4/8828; H01M 4/8878; H01M 4/8882; H01M 4/9083; H01M 4/926; H01M 8/1004; H01M 8/1018; Y02P 70/56
See application file for complete search history.

(56) References Cited

FOREIGN PATENT DOCUMENTS

| | | |
|---|---|---|
| JP | 5440487 B2 | 3/2014 |
| JP | 5766349 B2 | 8/2015 |
| KR | 10-0665689 B1 | 1/2007 |

\* cited by examiner

--RELATED ART--

--RELATED ART--

CATHODE FOR FUEL CELLS AND METHOD OF MANUFACTURING MEMBRANE ELECTRODE ASSEMBLY HAVING THE SAME

CROSS-REFERENCE TO RELATED APPLICATION

This application is based on and claims the benefit of priority to Korean Patent Application No. 10-2016-0181660 filed on Dec. 28, 2016 with the Korean Intellectual Property Office, the entire contents of which are incorporated herein by reference.

TECHNICAL FIELD

The present disclosure relates to a cathode for fuel cells and a method of manufacturing a membrane electrode assembly having the same. More particularly, it relates to a cathode which improves performance of a fuel cell by decreasing oxygen diffusion resistance.

BACKGROUND

In general, a Polymer Electrolyte Membrane Fuel Cell (PEMFC) includes a Membrane Electrode Assembly (MEA) including an anode, a cathode and a polymer electrolyte membrane disposed between the anode and the cathode. An oxidation reaction of fuel occurs at the anode to which hydrogen or fuel is supplied, hydrogen ions generated at the anode are conducted to the cathode through the electrolyte membrane, and a reduction reaction of oxygen occurs at the cathode to which oxygen is supplied, thus generating current.

The anode and the cathode of the fuel cell require a catalyst for oxidation and reduction reactions of the fuel, and a Pt/C catalyst or a Pt/alloy/C catalyst is generally used for the catalyst. An electrode of the fuel cell includes an ionomer formed of the same component as the electrolyte membrane, together with the catalyst for oxidation and reduction reactions, so as to transfer hydrogen ions generated at the anode to the cathode. Such an ionomer serves as both a hydrogen ion conductor and a binder that physically binds Pt/C catalyst particles of the electrode.

The oxidation and reduction reactions should effectively occur at the cathode. However, if the ionomer located at the cathode coats catalyst particles to an excessively thick thickness, resistance to oxygen gas transmission is increased. On the other hand, if the ionomer coats catalyst particles to an excessively thin thickness or does not coat catalyst particles, resistance to hydrogen gas transmission is increased and, thus, there is a tradeoff. Therefore, the amount of the ionomer is generally controlled so as to coat the catalyst layer to a proper thickness.

Furthermore, the amount of platinum used for the catalyst should be decreased to lower the cost of the fuel cell. However, if the amount of platinum in an electrode layer is decreased, particularly for the cathode, an ionomer film coating catalyst particles has greater resistance to diffusion of oxygen to the catalyst particles. Performance of the fuel cell having a greatly reduced amount of platinum is thereby lowered.

SUMMARY

The present disclosure has been made in an effort to solve the above-described problems associated with the related art and thus the present disclosure provides a cathode of a Polymer Electrolyte Membrane Fuel Cell (PEMFC) which improves performance of the fuel cell by decreasing oxygen diffusion resistance.

In one aspect, a cathode for fuel cells may include a carbon support, a platinum catalyst supported on the carbon support, and an ionomer surrounding the carbon support and the platinum catalyst, wherein the ionomer is removed from a surface of the platinum catalyst.

In a preferred embodiment, the carbon support may be a highly crystalline carbon support having a high degree of graphitization.

In one aspect, a method of manufacturing a membrane electrode assembly for fuel cells includes coating a surface of a platinum catalyst supported on a carbon support with an amorphous carbon layer by mixing the platinum catalyst supported on the carbon support with a polymer containing carbon and a solvent and carbonizing the platinum catalyst mixed with the polymer and the solvent, preparing an electrode forming slurry by mixing the carbonized platinum catalyst with an ionomer, preparing a cathode using the slurry, manufacturing a membrane electrode assembly using the prepared cathode, an electrolyte membrane and an anode, and removing the ionomer from the surface of the platinum catalyst of the cathode by oxidizing the amorphous carbon layer coating the surface of the platinum catalyst.

In a preferred embodiment, the carbon support may be a highly crystalline carbon support having a high degree of graphitization, and the polymer containing carbon may be polydopamine.

In another preferred embodiment, in carbonization of the platinum catalyst mixed with the polymer containing carbon and the solvent, the polymer containing carbon coating the platinum catalyst may form the amorphous carbon layer by drying a mixing solution, acquired by mixing the platinum catalyst supported on the carbon support with the polymer containing carbon and the solvent, and then heating an acquired powder under a nitrogen atmosphere, or the polymer containing carbon coating the platinum catalyst may form the amorphous carbon layer by heating a mixing solution, acquired by mixing the platinum catalyst supported on the carbon support with the polymer containing carbon and the solvent, under a nitrogen atmosphere until the solvent is dried, raising the temperature of an acquired mixing solution to 700 to 900° C. and then maintaining the temperature of the mixing solution.

In still another preferred embodiment, the amorphous carbon layer may be an amorphous carbon layer having a low degree of graphitization.

In yet another preferred embodiment, oxidization of the amorphous carbon layer may be carried out by applying a voltage of 1.2 to 1.4 V to the cathode while supplying nitrogen gas and hydrogen gas to the cathode and the anode, respectively, or be carried out by maintaining the membrane electrode assembly for 5 to 20 minutes while supplying nitrogen gas and air to the cathode and the anode, respectively, and extracting a current of 0.1 to 0.2 A/cm$^2$ from the cathode.

Other aspects and preferred embodiments of the invention are discussed infra.

The above and other features of the invention are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
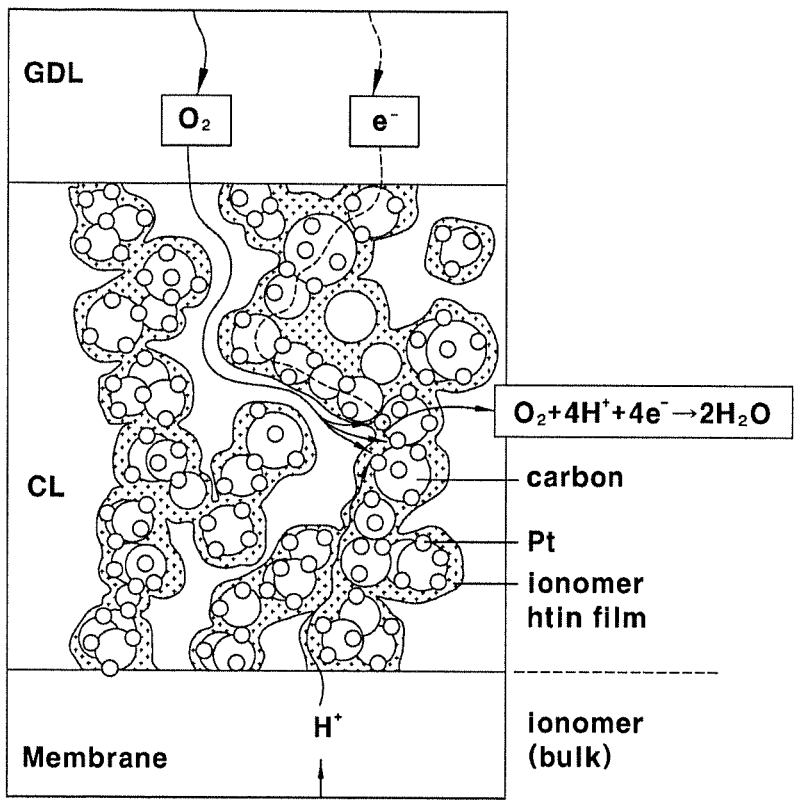
FIG. 1 is an illustrative view showing the structure of a conventional fuel cell.
Figure 2:
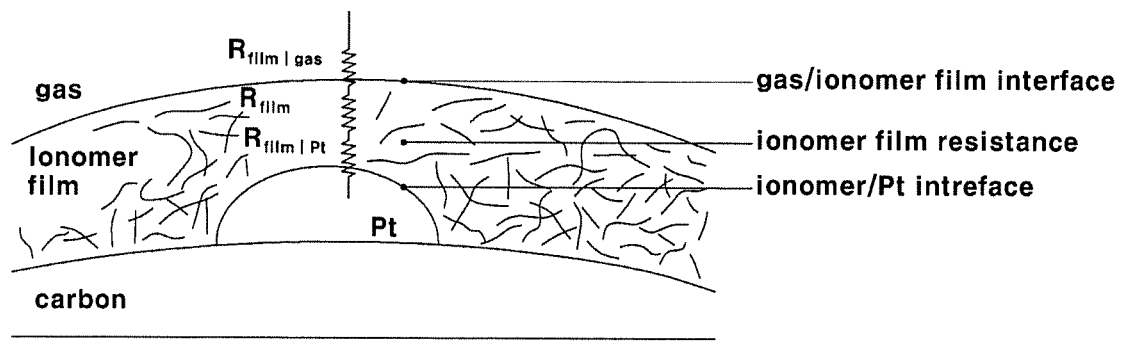
FIG. 2 is an illustrative view showing the structure of a cathode of the conventional fuel cell.
Figure 3:
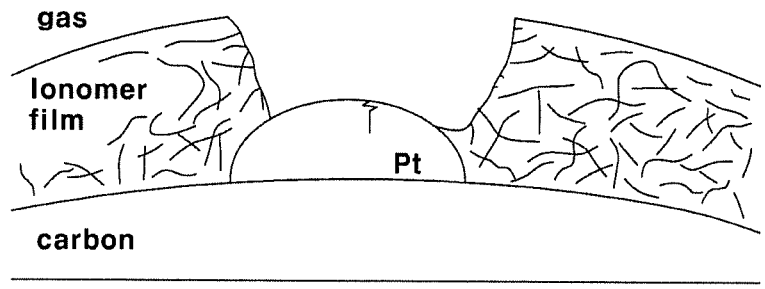
FIG. 3 is an illustrative view showing the structure of a cathode, from which an ionomer is removed, in accordance with the present disclosure.
Figure 4:
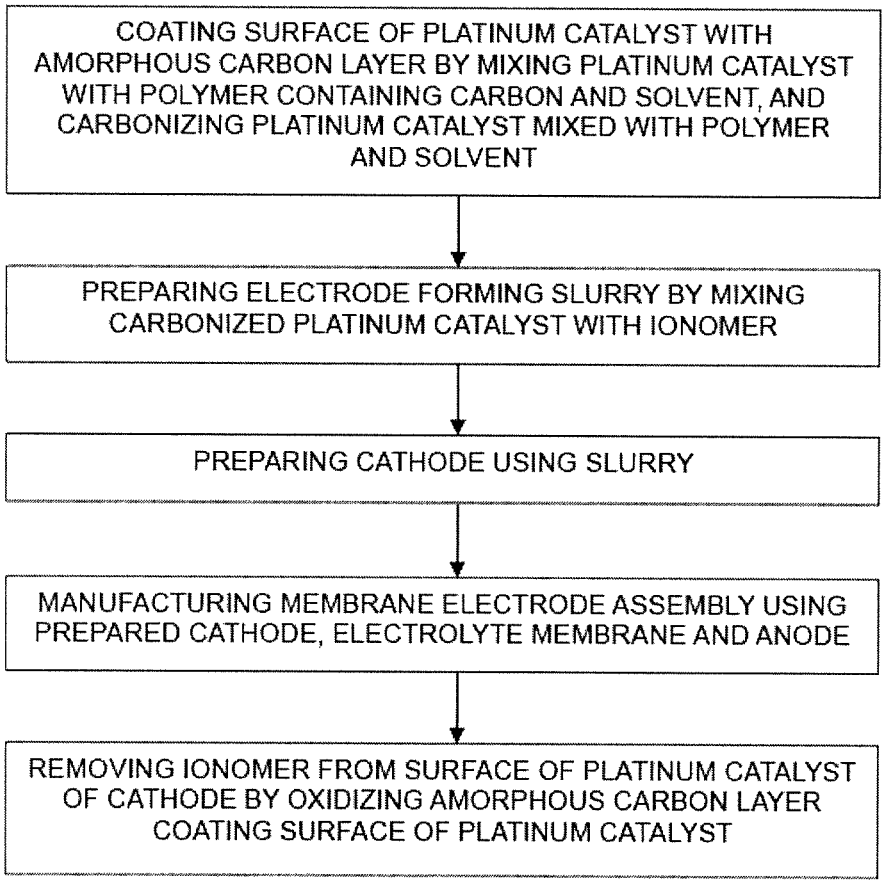
FIG. 4 is a flow chart showing the method steps in claim 6.

It should be understood that the appended drawings are not necessarily to scale, presenting a somewhat simplified representation of various preferred features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the invention will be described in conjunction with exemplary embodiments, it will be understood that the present description is not intended to limit the invention to the exemplary embodiments. On the contrary, the invention is intended to cover not only the exemplary embodiments, but also various alternatives, modifications, equivalents and other embodiments within the spirit and scope of the invention as defined by the appended claims. In the following description of the present disclosure, a detailed description of known functions and configurations incorporated herein will be omitted when it may make the subject matter of the present disclosure rather unclear.

A cathode for fuel cells in accordance with one embodiment of the present disclosure may include a carbon support, a platinum catalyst supported on the carbon support, and an ionomer surrounding the carbon support and the platinum catalyst. The cathode may have a structure in which the ionomer is removed from the surface of the platinum catalyst.

In a conventional platinum catalyst supported on a carbon support, an ionomer, i.e., a proton conductor, coats the surface of the platinum catalyst so that resistance to movement of oxygen to the platinum catalyst is increased.

Therefore, the inventor(s) of the present disclosure confirmed through tests that, in a structure of a fuel cell in which an ionomer surrounds a carbon support and a platinum catalyst, if the ionomer is removed only from the surface of the platinum catalyst, performance of the fuel cell may be improved due to decrease in mass transfer resistance (oxygen diffusion resistance).

Hereinafter, a cathode for fuel cells and a method of manufacturing a membrane electrode assembly having the same in accordance with one embodiment of the present disclosure will be described in more detail.

The method of manufacturing the membrane electrode assembly in accordance with one embodiment of the present disclosure includes coating the surface of a platinum catalyst supported on a carbon support with an amorphous carbon layer by mixing the platinum catalyst with a polymer containing carbon and a solvent and carbonizing the platinum catalyst mixed with the polymer and the solvent; mixing the carbonized platinum catalyst with an ionomer and preparing an electrode forming slurry; preparing a cathode using the slurry; manufacturing a membrane electrode assembly using the prepared cathode, an electrolyte membrane and an anode; and removing the ionomer from the surface of the platinum catalyst of the cathode by oxidizing the amorphous carbon layer coating the surface of the platinum catalyst.

The carbon support and the platinum catalyst supported thereon are mixed with a polymer containing carbon and a solvent, thus preparing a mixing solution.

Here, a carbon support having a high degree of graphitization, i.e., a carbon support having high crystallinity, is used as the carbon support. The reason for this is to cause a difference in resistance to oxidation with a carbon layer, which will subsequently coat the platinum catalyst.

Further, polydopamine may be used as the polymer containing carbon.

In order to carbonize the mixing solution, first, the mixing solution may be dried, thus forming a powder. When the acquired powder is heated to a temperature of 400 to 900° C. for 30 minutes to 2 hours in a furnace under a nitrogen atmosphere, the polymer containing carbon coating the surface of the platinum catalyst forms an amorphous carbon layer.

Otherwise, such carbonization is carried out by heating the mixing solution, acquired by mixing the platinum catalyst supported on the carbon support with the polymer containing carbon and the solvent, under a nitrogen atmosphere until the solvent is dried, raising the temperature of the mixture to 400 to 900° C. and then maintaining the temperature of the mixture for 30 minutes to 2 hours, thereby causing the polymer containing carbon coating the surface of the platinum catalyst to form the amorphous carbon layer.

The formed amorphous carbon layer is an amorphous carbon layer having a low degree of graphitization. Such an amorphous carbon layer has much lower resistance to oxidization than the highly crystalline carbon support.

Thereafter, the carbonized platinum catalyst (the surface of which is coated with the amorphous carbon layer) is mixed with an ionomer and an electrode forming slurry is prepared, thus preparing a cathode.

Thereafter, a membrane electrode assembly is manufactured using the prepared cathode, an electrolyte membrane and an anode. Up to such an operation, the surface of the platinum catalyst is coated with the amorphous carbon layer and the ionomer surrounds the platinum catalyst coated with the amorphous carbon layer.

Finally, the ionomer is removed from the surface of the platinum catalyst by oxidizing the amorphous carbon layer.

Oxidization of the amorphous carbon layer may be carried out by applying a voltage of 1.2 to 1.4 V to the cathode while supplying nitrogen gas to the cathode and hydrogen gas to the anode.

That is, since there is a remarkable difference in resistance to oxidization between the amorphous carbon layer and graphitized carbon particles used as a support of the platinum catalyst, when a voltage of 1.2 to 1.4 V is applied to the cathode of the manufactured membrane electrode assembly while supplying nitrogen gas to the cathode and hydrogen gas to the anode of the membrane electrode assembly, the amorphous carbon layer is oxidized due to a difference in crystallinity between the amorphous carbon layer and graphitized carbon particles and is thus removed together with the ionomer, but the graphitized carbon particles used as the catalyst support are not oxidized.

Further, oxidation of the amorphous carbon layer may be carried out by maintaining the membrane electrode assembly for 5 to 20 minutes while supplying nitrogen gas to the cathode and air to the anode and extracting a current of 0.1 to 0.2 A/cm$^2$ from the cathode.

That is, when the manufactured membrane electrode assembly is maintained for a designated time (5 to 20 minutes) while supplying nitrogen gas to the cathode and air to the anode and extracting a current of 0.1 to 0.2 A/cm$^2$ from the cathode using a potentiostat, the amorphous carbon layer may be more rapidly oxidized, thus removing the ionomer.

A cathode for fuel cells in accordance with another embodiment of the present disclosure may include a carbon support, a platinum catalyst supported on the carbon support, and an ionomer surrounding the carbon support and the platinum catalyst, and have a structure in which the ionomer is removed from the surface of the platinum catalyst.

In this case, an ionomer film coating the surface of the platinum catalyst and thus acting as oxygen transfer resistance is removed from the surface of the platinum catalyst and, thus, oxygen diffusion resistance may be reduced and performance of a fuel cell may be improved.

The cathode prepared by the above-described method may have the above-described structure and be thus configured such that the carbon support and the platinum catalyst are surrounded with the ionomer but the ionomer is removed from the surface of the platinum catalyst.

Hereinafter, reference will be made in detail to various embodiments of the present disclosure, examples of which are illustrated in the accompanying drawings and described below. While the invention will be described in conjunction with exemplary embodiments, it will be understood that the present description is not intended to limit the invention to the exemplary embodiments.

Example

The following example illustrates the invention and is not intended to limit the same.

A platinum catalyst supported on a highly crystalline carbon support having a high degree of graphitization is mixed with polydopamine and a solvent, thus preparing a mixing solution. After the mixing solution is dried, an acquired powder is heated to a temperature of 800° C. in a furnace for 2 hours, thus being carbonized.

After slurry is prepared by mixing the carbonized platinum catalyst with an ionomer, a cathode is prepared. A membrane electrode assembly (MEA) is manufactured using the prepared cathode, an electrolyte membrane and an anode.

Thereafter, the ionomer is removed from the surface of the platinum catalyst by oxidizing an amorphous carbon layer coating the platinum catalyst by applying a voltage of 1.3 V to the cathode while supplying nitrogen gas to the cathode and hydrogen gas to the anode of the MEA.

Thereby, a cathode structure, in which the carbon support and the platinum catalyst are surrounded with the ionomer but the ionomer is removed from the surface of the platinum catalyst, may be acquired.

As apparent from the above description, a cathode for fuel cells manufactured in accordance with one embodiment of the present disclosure has a structure in which an ionomer film coating the surface of a platinum catalyst and thus acting as oxygen transfer resistance is removed from the surface of the platinum catalyst and, thus, mass transfer resistance (oxygen diffusion resistance) may be reduced and performance of a fuel cell may be improved.

Further, the cathode having a low amount of platinum used due to improvement in platinum utilization may effectively execute oxygen transfer and thus increase the amount of platinum participating in catalysis, as compared to conventional cathodes.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of manufacturing a membrane electrode assembly for fuel cells, the method comprising:
    coating a surface of a platinum catalyst supported on a carbon support with an amorphous carbon layer by mixing the platinum catalyst supported on the carbon support with a polymer containing carbon and a solvent, and carbonizing the platinum catalyst mixed with the polymer and the solvent;
    preparing an electrode forming slurry by mixing the carbonized platinum catalyst with an ionomer;
    preparing a cathode using the slurry;
    manufacturing a membrane electrode assembly using the prepared cathode, an electrolyte membrane and an anode; and
    removing the ionomer from the surface of the platinum catalyst of the cathode by oxidizing the amorphous carbon layer coating the surface of the platinum catalyst.

2. The method of claim 1, wherein the carbon support is a crystalline carbon support having a degree of graphitization.

3. The method of claim 1, wherein the polymer containing carbon is polydopamine.

4. The method of claim 1, wherein in carbonization of the platinum catalyst mixed with the polymer containing carbon and the solvent, the polymer containing carbon coating the platinum catalyst forms the amorphous carbon layer by drying a mixing solution, acquired by mixing the platinum catalyst supported on the carbon support with the polymer containing carbon and the solvent, and then heating an acquired powder under a nitrogen atmosphere.

5. The method of claim 1, wherein in carbonization of the platinum catalyst mixed with the polymer containing carbon and the solvent, the polymer containing carbon coating the platinum catalyst forms the amorphous carbon layer by heating a mixing solution, acquired by mixing the platinum catalyst supported on the carbon support with the polymer containing carbon and the solvent, under a nitrogen atmosphere until the solvent is dried, raising temperature of the acquired mixing solution to 400 to 900° C. and then maintaining the temperature of the mixing solution.

6. The method of claim 1, wherein oxidization of the amorphous carbon layer is carried out by applying a voltage of 1.2 to 1.4 V to the cathode while supplying nitrogen gas and hydrogen gas to the cathode and the anode, respectively.

7. The method of claim 1, wherein oxidization of the amorphous carbon layer is carried out by maintaining the membrane electrode assembly for 5 to 20 minutes while supplying nitrogen gas and air to the cathode and the anode, respectively, and extracting a current of 0.1 to 0.2 A/cm$^2$ from the cathode.

\* \* \* \* \*